United States Patent [19]
Broadfield et al.

[11] Patent Number: 5,782,646
[45] Date of Patent: Jul. 21, 1998

[54] COMBINED CONNECTOR CONTACT

[75] Inventors: Gary Broadfield, Kumamoto, Japan; Marrku Syrjala, Halikko, Finland

[73] Assignees: Nokia Mobile Phones Limited, Espoo, Finland; Hirose Electric Co., Ltd., Tokyo, Japan

[21] Appl. No.: 873,824

[22] Filed: Jun. 12, 1997

Related U.S. Application Data

[63] Continuation of Ser. No. 525,988, Sep. 8, 1995, abandoned.

[30] Foreign Application Priority Data

Sep. 9, 1994 [GB] United Kingdom ............ 9418235

[51] Int. Cl.⁶ .................................................. H01R 9/09
[52] U.S. Cl. ............................ 439/346; 439/607; 439/638
[58] Field of Search ..................................... 439/76.1, 324, 439/346, 607, 638, 95, 352

[56] References Cited

U.S. PATENT DOCUMENTS

| | | | |
|---|---|---|---|
| 4,248,494 | 2/1981 | McDonald et al. | 439/638 |
| 4,699,438 | 10/1987 | Kikuta | 439/95 |
| 5,234,353 | 8/1993 | Scholz et al. | 439/289 |
| 5,326,283 | 7/1994 | Chen | 439/638 |

*Primary Examiner*—Gary F. Paumen
*Assistant Examiner*—Tho D. Ta
*Attorney, Agent, or Firm*—Perman & Green, LLP

[57] ABSTRACT

A combined connector for providing charging current to a battery of a radio telephone comprises an electrically conductive charging pad contact, and a connector for receiving signals from a corresponding mating cable. The electrically conductive charging pad contact including a latching hole for releasably locking a mating cable against withdrawal from the combined connector.

17 Claims, 4 Drawing Sheets

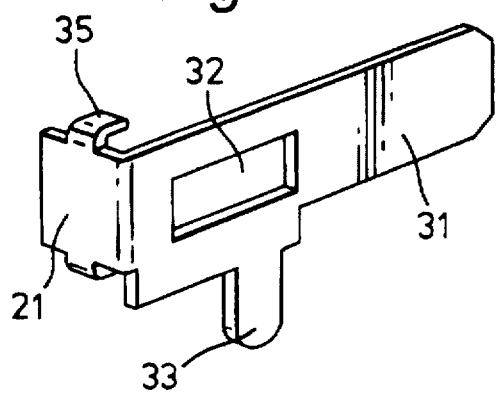
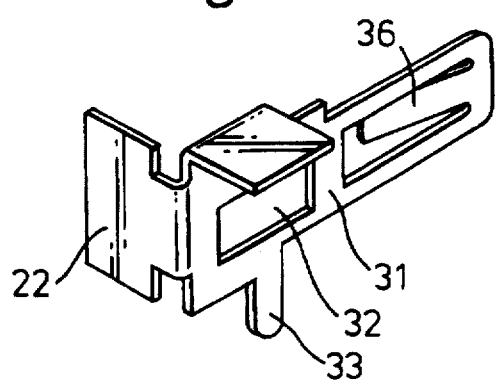
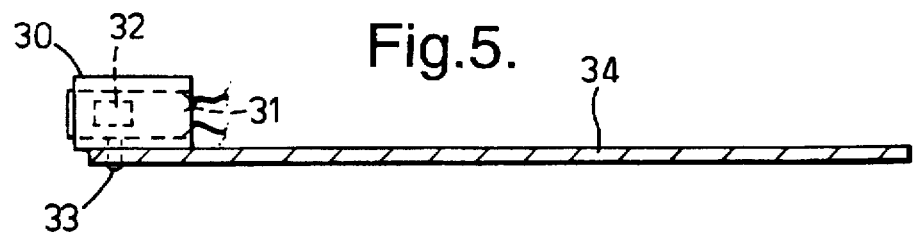
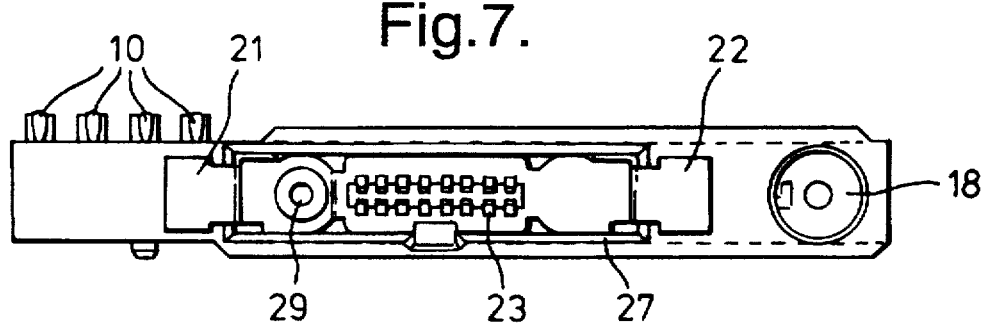
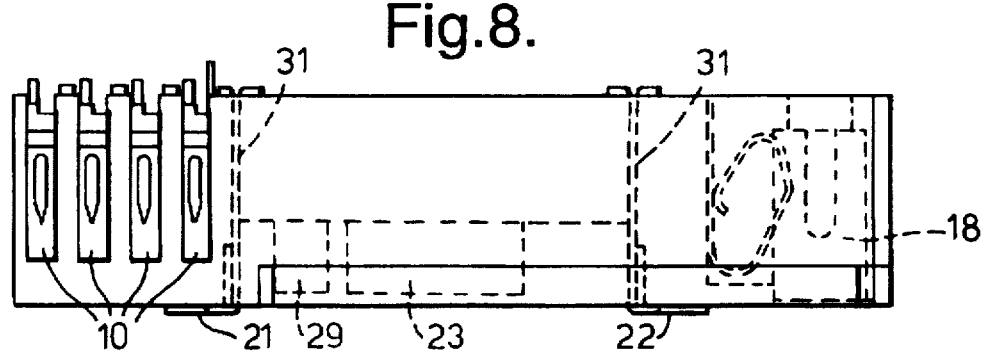

COMBINED CONNECTOR CONTACT

This application is a continuation of application(s) Ser. No. 08/525.988 filed on Sep. 8, 1995 now abandoned.

BACKGROUND OF THE INVENTION

The invention relates to electrical connectors and in particular to combined connectors suitable for use in providing charging current for batteries in radio telephones.

A combined connector provides means by which a charging current can be supplied to a radio telephone battery through a charging pad or through a charging contact designed for mating attachment with a cable. A separate single pin dc connector is typically also provided alongside the combined connector. Each of the connectors can be used independently to charge the battery. A mechanical arrangement is provided to prevent the different charging routes from being utilized simultaneously.

FIG. 1 illustrates a typical prior art multi-pin connector. Four sockets 1–4 are provided on the combined connector for attachment to a cable connector providing charging current along with two pins 5, 6 for providing radio frequency signals. A dc jack 9 is provided alongside the combined connector contact for receiving direct current from the mains or from a car battery through cigarette lighter jack.

In a typical cable connector four pins are provided for mating engagement with the four sockets of the combined connector contact. The cable connector has a metal shield surrounding the pins and includes a pair of retaining arms, one on each side of the connector shield that mate with complementary recesses in metal plates held in place in the connector socket. Push buttons on the sides of the cable connector are provided to retract the retaining arms from engagement with the respective recesses in the metal plates to make withdrawal possible.

Two charging pads 7, 8 are provided, one to each side of the multiple pin connector. In assembly these charging pads are threaded through the connector housing 11 and connected to the printed circuit board (pcb) of the radio telephone at the rear of the housing for coupling to the battery via contacts 10. The current flowing to the battery is controlled by microcomputer unit (MCU) to provide the desired regime for charging. The connector housing 11 is attached to the pcb by an adhesive.

SUMMARY OF THE INVENTION

In accordance with the present invention there is provided a combined connector for providing charging current to a battery of a radio telephone comprising an electrically conductive charging pad contact and a signal connector for receiving signals from a complementary cable connector, the electrically conductive charging pad contact providing means for releasably retaining the cable connector against withdrawal from the combined connector The invention gives several advantages. By combining the function of the prior art retaining plate and charging pad contact in a single element, a significant saving can be made in the total area of the combined connector along with a reduction in the component count reducing the cost of the combined connector.

The combined retaining plate/charging pad contact can additionally be utilized to firmly attach the connector to a printed circuit board. A leg can be provided that protrudes through the connector housing and extends to the pcb where it can then be soldered to the pcb to hold the combined connector contact firmly in position. With two such solder connections being possible, one from each of the charging pads, additional strength is provided. No adhesive is necessary for attachment to the pcb and this has the added advantage that a step in the manufacturing process is removed providing further cost advantages.

By positioning the combined retaining plate and charging pad contact in a position to mate with retaining arms on the shield of a mating cable, one of the charging pads contacts with the conductive shield of the mating cable and the other charging pad contacts with another conductor on the mating cable and the other charging pad contacts with another concuctor on the mating cable . This means that the connector pins of the connector themselves will no longer need to supply charging current. This has two potential benefits, the number of pins on the connector can be reduced with attendant cost and space savings or alternatively, pins no longer necessary for charging can be used to provide additional signals without increasing the size of the connector.

In accordance with a second aspect of the invention there is provided a connector arrangement for providing a charging current to a battery of a radio telephone comprising a combined connector including an electrically conductive charging pad contact and a signal connector, and a cable connector having a conductive shield and being arranged for mating engagement with the signal connector, the connector arrangement being such that signals from the cable connector are provided to the signal connector and current from the conductive shield is provided to the charging pad contact.

In accordance with a third aspect of the invention there is provided a radio telephone having a combined connector for providing charging current to a battery, the combined connector comprising an electrically conductive charging pad contact and a signal connector for receiving signals from a complementary cable connector, the electrically conductive charging pad contact providing means for releasably retaining a complementary cable connector against withdrawal from the combined connector.

BRIEF DESCRIPTION OF THE DRAWINGS

The invention will now be described in greater detail with reference to FIGS. 2 to 10 of the drawings of which:

FIG. 5 is a schematic representation showing the connector of FIG. 3 in relation to the printed circuit board of the radio telephone;

FIGS. 6A and 6B are perspective views of charging pad contacts;

FIG. 7 is an end view of a combined connector of another embodiment of the invention;

FIG. 8 is a top view of the combined connector contact of the FIG. 7;

DETAILED DESCRIPTION OF THE INVENTION

In order to enable a radio telephone to receive both current for charging a battery and other signals, a connector is provided. It is important that this connector can receive charging current from all suitable forms of connector and also that it is kept as compact and simple as possible. Charging current is typically supplied in one of three ways, through a dc jack, through a cable connector or from a desk top charger through a charging contact. In the third case electrical contact is achieved by placing the charging contacts onto current carrying sprung contacts. In order that existing chargers employing any one or more of these types of contacts are not made obsolete it is important that radio telephones remain compatible with existing charging hardware. A connector on a telephone should, therefore continue to be compatible with a dc jack, a stand-in desk charger and a cable connector.

Figure 1:
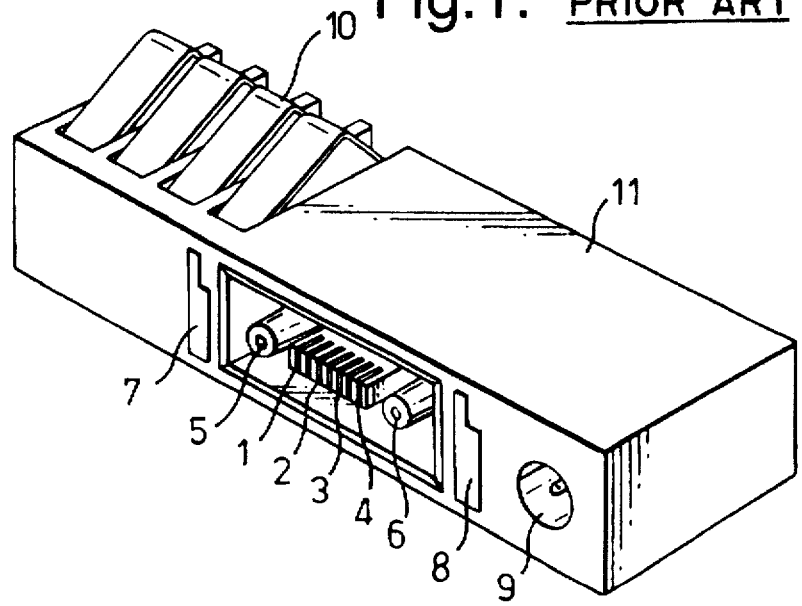
FIG. 1 is a prior art multi-pin connector.
Figure 2:
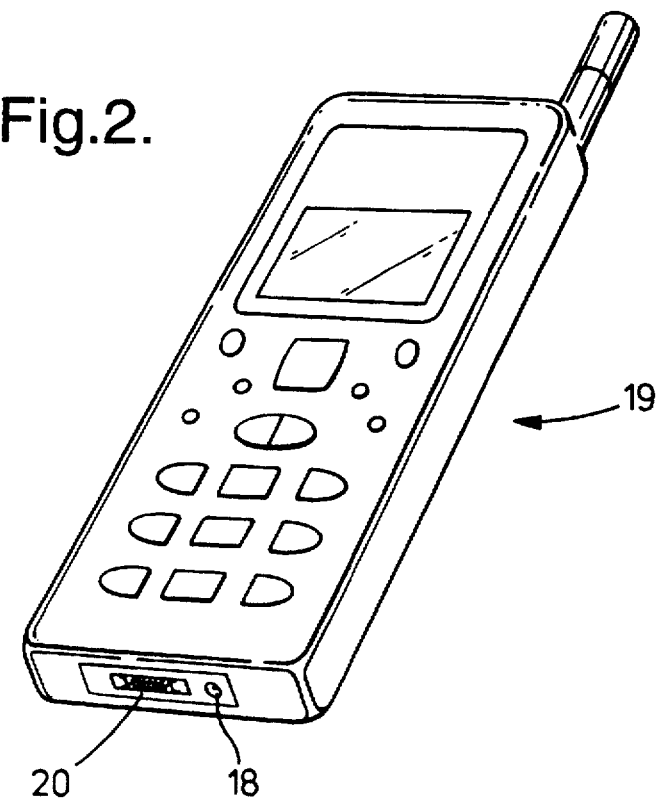
FIG. 2 is a radio telephone having a combined connector of the invention.
Figure 3:
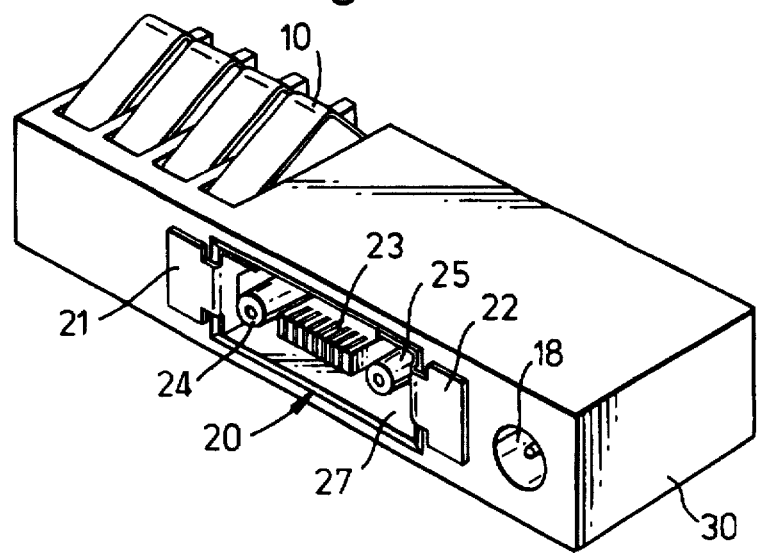
FIG. 3 is a enlarged view of the connector of FIG. 2.

In accordance with a first embodiment of the present invention; a radio telephone 19 having a combined connector 20 and a dc jack 18 is illustrated in FIG. 2. The combined connector 20 can be seen in greater detail in FIG. 3. The combined connector comprises charging pad connectors 21, 22 and a signal connector 23. The connector additionally has two radio frequency signal pins 24, 25. The signal connector 23 is designed to receive a mating cable connector 26 illustrated in FIG. 9.

Figure 4:
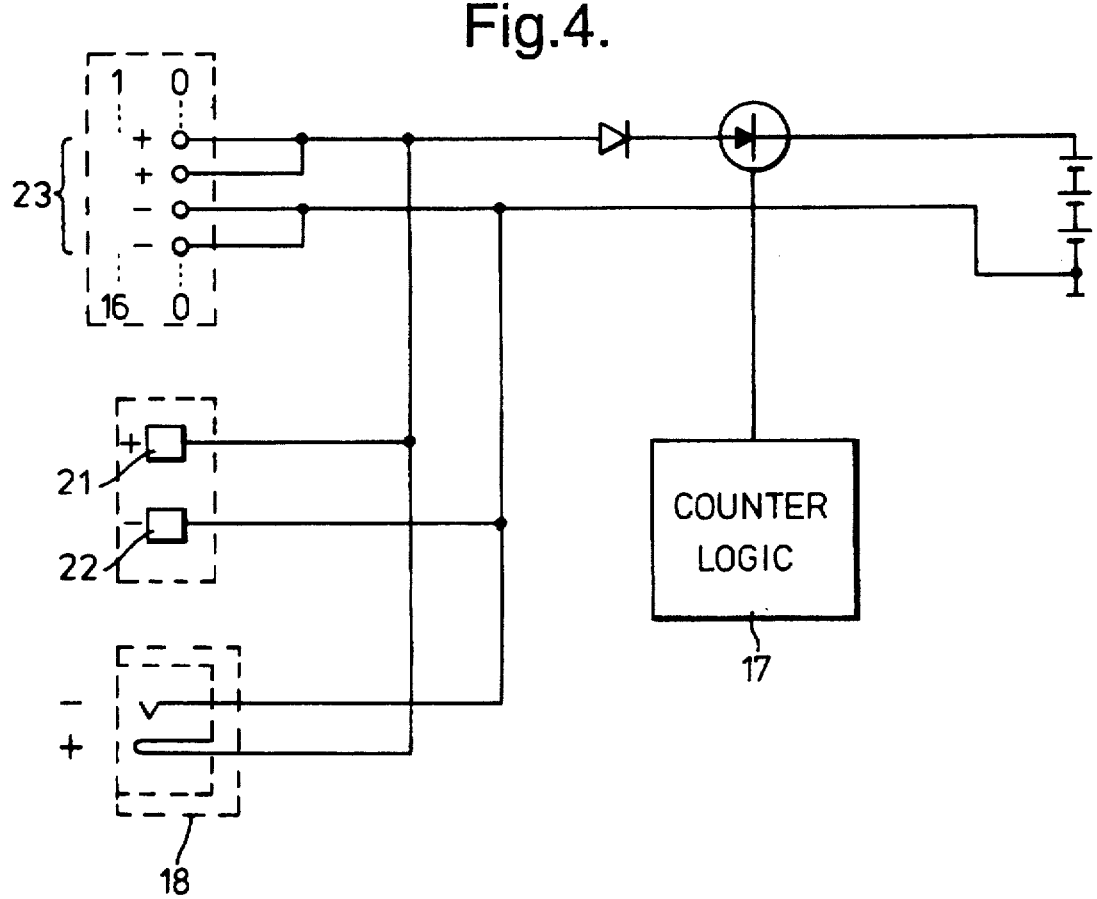
FIG. 4 is a schematic representation of the circuit layout of the connector of FIG. 3.

Four signal pins 23, two charge pad contacts 21, 22 and dc jack 18 can each be used independently to provide charging current to the battery. One of the charging pads 21, 22 contacts with the conductive shield 28 of the mating cable connector 26 and the other charging pad contacts with another conductor (not shown) on the mating cable connector 26. The radio telephone controls the supply of current from the connectors to the battery. Current flowing in each of the routes passes through a diode and is controlled by a central processing unit (cpu) 17 (FIG. 4).

To accommodate the mating cable connector 26 (FIG. 9), the combined connector 20 on the base of the phone 19 must provide a recess 27 to receive a conductive shield 28 of the cable connector 26 which typically has retaining arms 50 for securing the connection as well as signal sockets for mating with signal pins of the cable connector 26.

In this embodiment of the present invention, the charging pads 21, 22 of the combined connector 20 are disposed on a connector housing 30 along the wall of the recess 27 for receiving the conductive shield 28 of the cable connector 26. Electrically conductive contacts 31 (FIG. 6) leading from the charging pads 21, 22 are disposed against the outer walls of this recess 27 and the conductive contacts 31 of the charging pad themselves provide respective holes 32 for receiving the retaining arms 50 of the cable connector 26 to releasably retain the cable connector 26 in position.

By combining the functions of charging pad contacts 21, 22 and releasable retaining means in one element the combined connector arrangement is much simplified.

Each charging pad contact includes a leg 33 that protrudes through the housing 30 of the connector and is soldered to a printed circuit board (pcb) 34 (see FIG. 5). In this way the connector housing 30 is pinned to the pcb 34 at two distinct points and solder provides for a firm attachment. As generally illustrated in FIG. 4, the contacts 21, 22 are electrically coupled to the battery via conductive strips on the pcb 34. In addition, as other component parts are soldered to the pcb during the manufacture of a radio telephone, the connector housing 30 can be attached to the pcb 34 at the same time as these other components dispensing with an assembly stage.

To provide the required conduction characteristics the charging pad contact is preferably gold plated whereas the remainder of the contact is plated with tin or lead.

The connector is assembled by inserting the charging pad contacts 21, 22 into the recess in the direction of insertion of the mating cable connector 26. The charging pad contact illustrated in FIG. 6A is held in position by arms 35 that engage in corresponding recesses on the base of the phone. The charging pad contact of FIG. 6B is retained in position by tang 36 that prevents withdrawal through the front of the connector housing. Other means of attaching the charging pad contact to the connector housing could, however, be used instead.

Figure 10:
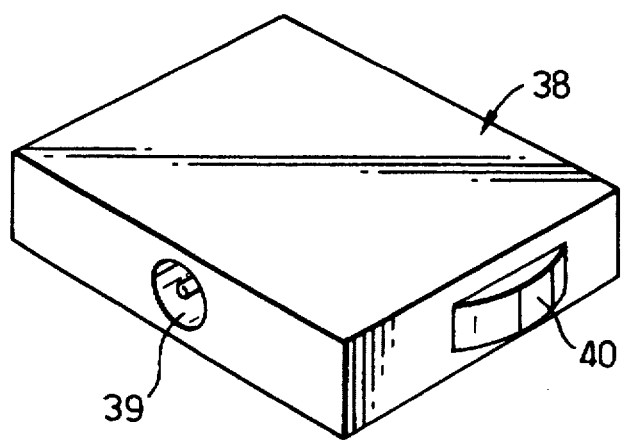
FIG. 10 is a schematic representation of a dc jack conversion module for use with connectors of embodiments of the invention.

In the embodiment illustrated a dc jack 18 is provided adjacent the combined connector 20. However, with the charging contact 31 lining the wall of the recess 27 a module 38 incorporating a dc jack 39, such as that illustrated in FIG. 10, can be used to adapt this arrangement to one which accepts current through a single pin dc plug. Contacts 40 on the outside of the module 38 provide for electrical coupling with the charging pad contacts 31. By inserting the dc jack module 38 into the recess 27 normally used to receive a cable connector, a dc pin can be used to supply charging current to a battery along the same route as current supplied via the charging pads. No permanent dc jack 18 is necessary and the mechanical arrangement for disabling the dc single pin charging route when not in use can be avoided.

Figure 9:
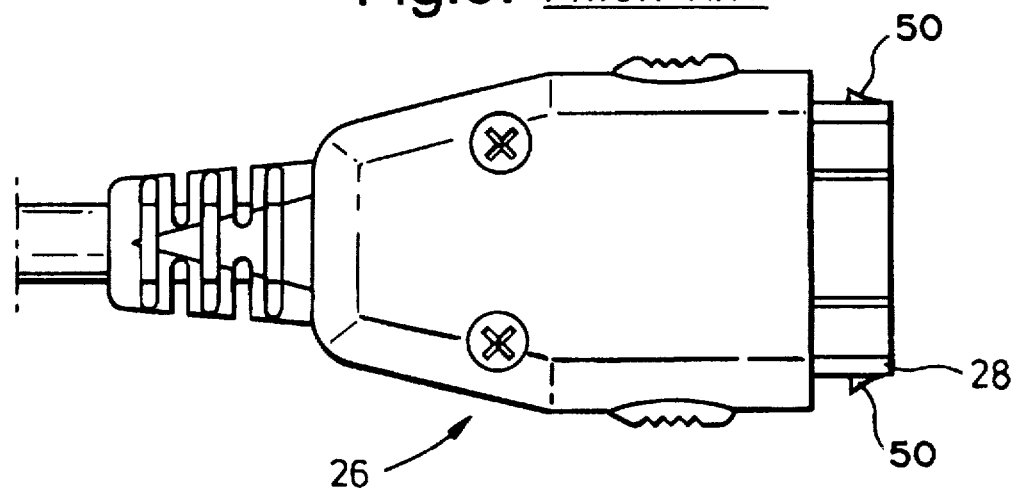
FIG. 9 is a schematic representation of a prior art cable connector for providing charging current and signals to the combined connector of FIG. 2.

Finally the arrangement of this embodiment of the present invention allows a further advantage to be enjoyed with a minor modification to the connector cables 26 of FIG. 9. By arranging for that cable connector 26 to supply charging current through the outer conductive shield 28, the connector pins 23 can either be reduced in number as the four pins typically used for charging are no longer necessary, or those pins could be used to supply signals of a different type without increasing the overall size or complexity of the system. The arrangement described above means that all charging current can be supplied through the charging pad contacts 21, 22; 31 regardless of the source of current greatly simplifying control of the charging route.

FIGS. 7 and 8 illustrate a second embodiment of the invention in which there is a single rf signal pin 29 instead of the two pins illustrated in the first embodiment. Otherwise the parts are alike. Like numerals are used to designate like parts.

The present invention includes any novel feature or combination of features disclosed herein either explicitly or any generalisation thereof irrespective of whether or not it relates to the claimed invention or mitigates any or all of the problems addressed.

In view of the foregoing description it will be evident that various modifications may be made within the scope of the invention.

What is claimed is:

1. A radio telephone combined connector for providing charging current to a battery of a radio telephone comprising a first electrically conductive charging pad contact, a second electrically conductive charging pad contact and a signal connector for receiving signals from a complementary cable connector, the first electrically conductive charging pad contact providing latching means for releasably retaining the cable connector against withdrawal from the combined connector, wherein the first and second charging pad contacts form part of a means which, when separately coupled to opposite terminals of the battery, forms a circuit loop from the first charging pad contact, through the battery, and to the second charging pad contact, wherein battery charging current can be provided through the first and second charging pad contacts.

2. A combined connector according to claim 1 wherein the electrically conductive charging pad contacts are electrically coupled to the battery via conductive strips on a printed circuit board.

3. A combined connector according to claim 2 wherein the combined connector is disposed in a housing and mounted on the printed circuit board and wherein the first electrically conductive charging pad contact further comprises a leg arranged for pinning the housing to the printed circuit board.

4. A combined connector according to claim 3 wherein the leg is soldered to the printed circuit board.

5. A combined connector as in claim 1 wherein the first charging pad contact is located directly opposite one side end of the signal connector and the second charging pad contact is located directly opposite an opposite side end of the signal connector.

6. A combined connector as in claim 5 wherein the combined connector is sized and shaped to be inserted into a recess of a housing as a single unit.

7. A connector arrangement for providing a charging current to a battery of a radio telephone comprising a combined connector including a first electrically conductive charging pad contact, a second electrically conductive charging pad contact and a signal connector, and a cable connector having a conductive shield and being arranged for mating engagement with the signal connector, the connector arrangement being such that signals from the cable connector are provided to the signal connector and current from the conductive shield is provided to the first charging pad contact, wherein the first electrically conductive charging pad includes means for releasably locking the cable connector against withdrawal from the signal connector comprising a hole in a first section of the first charging pad, and the first charging pad having a second section transverse to the first section at a front of the first charging pad adapted to contact the conductive shield at a front of the cable connector.

8. A connector arrangement according to claim 7 further comprising a dc jack converter including means for coupling the electrically conductive charging pad connector with a dc jack.

9. A connector arrangement as in claim 7 wherein the first charging pad contact is located directly opposite one side end of the signal connector and the second charging pad contact is located directly opposite an opposite side end of the signal connector.

10. A connector arrangement as in claim 9 wherein the connector arrangement is sized and shaped to be inserted into a recess of a housing as a single unit.

11. A radio telephone having a combined connector for providing charging current to a battery, the combined connector comprising an electrically conductive charging pad contact coupled to the battery and a signal connector for receiving signals from a complementary cable connector, the electrically conductive charging pad connector providing means for releasably retaining a mating cable connector against withdrawal from the connector, wherein the radio telephone has a housing with a recess, the signal connector and the charging pad contact both being located at least partially in the recess, the charging pad contact having a first section and a second section, the first section being located in the recess and comprising the means for releasably retaining, and the second section being located on an exterior side of a housing of the combined connector and forming an electrical contact pad area at the exterior side of the combined connector housing.

12. A radio telephone as in claim 11 wherein the charging pad contact has means for direct connection to a circuit board of the telephone.

13. A radio telephone as in claim 12 wherein the means for direct connection has a leg that is inserted into the circuit board.

14. A radio telephone as in claim 11 wherein the combined connector further comprises a second charging pad contact, wherein the two charging pad contacts are located on opposite sides of the signal connector.

15. A radio telephone as in claim 14 wherein the two charging pad contacts each have a leg that are inserted into a circuit board.

16. A radio telephone electrical contact comprising:
  a first section having a solder tail mounting leg for mounting into a hole of a printed circuit board, and a hole for releasably retaining a latch from a mating electrical connector; and
  a second section located at a front end of the first section and extending generally perpendicular from the front end of the first section, the second section having a general flat shape to form an electrical contact pad area, wherein the contact is a one-piece member.

17. A contact as in claim 16 wherein the contact further comprises a third section at an opposite end of the first section with a cantilevered tang for latching with a connector housing and preventing withdraw of the contact through a front of the connector housing.

* * * * *

UNITED STATES PATENT AND TRADEMARK OFFICE
CERTIFICATE OF CORRECTION

PATENT NO. : 5,782,646
DATED : 7/21/98
INVENTOR(S) : BROADFIELD et al.

It is certified that error appears in the above-identified patent and that said Letters Patent is hereby corrected as shown below:

On the title page, Item [75] Inventors, the first name of the second named inventor is --MARKKU--.

Signed and Sealed this

Twenty-ninth Day of December, 1998

Attest:

BRUCE LEHMAN

*Attesting Officer*  *Commissioner of Patents and Trademarks*